United States Patent
Jagmag

(10) Patent No.: US 9,565,471 B2
(45) Date of Patent: Feb. 7, 2017

(54) METHOD AND SYSTEM FOR PVR ON INTERNET ENABLED TELEVISIONS (TVS)

(75) Inventor: Adil Jagmag, Hollis, NH (US)

(73) Assignee: BROADCOM CORPORATION, Irvine, CA (US)

( * ) Notice: Subject to any disclaimer, the term of this patent is extended or adjusted under 35 U.S.C. 154(b) by 687 days.

(21) Appl. No.: 12/539,337

(22) Filed: Aug. 11, 2009

(65) Prior Publication Data
US 2011/0019978 A1    Jan. 27, 2011

Related U.S. Application Data

(60) Provisional application No. 61/228,230, filed on Jul. 24, 2009.

(51) Int. Cl.
| | |
|---|---|
| H04N 5/76 | (2006.01) |
| H04N 5/783 | (2006.01) |
| H04N 21/44 | (2011.01) |
| H04N 7/173 | (2011.01) |
| H04N 21/234 | (2011.01) |
| H04N 21/2343 | (2011.01) |
| H04N 21/2387 | (2011.01) |
| H04N 21/2662 | (2011.01) |
| H04N 21/4147 | (2011.01) |
| H04N 21/472 | (2011.01) |
| H04N 21/6587 | (2011.01) |

(Continued)

(52) U.S. Cl.
CPC .... *H04N 21/44016* (2013.01); *H04N 7/17318* (2013.01); *H04N 21/2387* (2013.01); *H04N 21/23424* (2013.01); *H04N 21/23439* (2013.01); *H04N 21/2662* (2013.01); *H04N 21/4147* (2013.01); *H04N 21/44004* (2013.01); *H04N 21/47202* (2013.01); *H04N 21/6587* (2013.01); *H04N 21/812* (2013.01); *H04N 21/478* (2013.01)

(58) Field of Classification Search
USPC .................................................. 386/291–299
See application file for complete search history.

(56) References Cited

U.S. PATENT DOCUMENTS

| | | | |
|---|---|---|---|
| 8,428,421 B2 * | 4/2013 | Bhogal | H04N 5/85 386/201 |
| 2004/0234237 A1 * | 11/2004 | Hamada et al. | 386/52 |

(Continued)

*Primary Examiner* — Nigar Chowdhury
(74) *Attorney, Agent, or Firm* — Foley & Lardner LLP

(57) ABSTRACT

A media playback device may be operable to determine whether replacement media content corresponding to at least a portion of a received broadcast media stream is available during reception of the broadcast media stream from one or more broadcast sources. At least some of the replacement media content may then be retrieved when personal video recording (PVR) operations are requested during play of the received broadcast media stream, to enable seamless performance of the requested PVR operations using at least a portion of the retrieved replacement media content. Exemplary PVR operations may comprise pausing, fast forwarding, and/or rewinding. The replacement media content may be retrieved from a plurality of local and/or remote replacement servers. Availability of replacement media content, from remote replacement servers, may be determined based on programming data in said broadcast media stream, routing information provided by a broadcast source, and/or by inquiry via one or more cataloguing servers.

21 Claims, 4 Drawing Sheets

(51) Int. Cl.
 *H04N 21/81* (2011.01)
 *H04N 21/478* (2011.01)

(56) References Cited

U.S. PATENT DOCUMENTS

| | | | |
|---|---|---|---|
| 2008/0059997 A1* | 3/2008 | Plotnick et al. | 725/32 |
| 2008/0155585 A1* | 6/2008 | Craner et al. | 725/32 |
| 2009/0106790 A1* | 4/2009 | Tseng | H04H 20/57 725/32 |
| 2010/0228631 A1* | 9/2010 | Zhang et al. | 705/14.66 |

* cited by examiner

METHOD AND SYSTEM FOR PVR ON INTERNET ENABLED TELEVISIONS (TVS)

CROSS-REFERENCE TO RELATED APPLICATIONS/INCORPORATION BY REFERENCE

This patent application makes reference to, claims priority to and claims benefit from U.S. Provisional Application Ser. No. 61/228230 filed on Jul. 24, 2009.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to device management. More specifically, certain embodiments of the invention relate to a method and system for PVR on Internet enabled televisions (TVs).

BACKGROUND OF THE INVENTION

Audiovisual display devices are utilized to play broadcast media streams received from broadcast head-ends. Broadcast media streams are received via the Internet and/or via TV broadcasts. For example, Television (TV) broadcasts are generally transmitted by television head-ends over broadcast channels, via RF carriers. The TV head-ends may comprise terrestrial TV head-ends, Cable-Television (CATV), and/or satellite TV head-ends. The TV head-ends may utilize, for example, a set of broadcast channels to facilitate TV broadcast. The TV broadcasts comprise transmission of video and/or audio information, wherein the video and/or audio information may be encoded into the broadcast channels via one of plurality of available modulation schemes. The TV Broadcasts may utilize analog and/or digital modulation format. In analog television systems, picture and sound information are encoded into, and transmitted via analog signals, wherein the audio/video information may be conveyed via broadcast signals, via amplitude and/or frequency modulation on the television signal, based on analog television encoding standard. Analog television broadcasters may, for example, encode their signals using NTSC, PAL and/or SECAM analog encoding and then modulate these signals onto a VHF or UHF RF carriers, for example.

In digital television (DTV) systems, television broadcasts may be communicated by terrestrial, cable, and/or satellite head-ends via discrete (digital) signals, utilizing one or more of available digital modulation schemes, which may comprise, for example, QAM, VSB, QPSK, and/or OFDM. The use of digital signals generally requires less bandwidth than analog signals to convey the same amount of information. Accordingly, DTV systems may enable broadcasters to provide more digital channels within the same space otherwise available to analog television systems. In addition, the use of digital television signals may enable broadcasters to provide high-definition television (HDTV) broadcasting and/or to provide other non-television related service via the digital system. Available digital television systems comprise, for example, ATSC, DVB, and/or VSB based systems.

Video and/or audio information may be encoded into digital television signals utilizing various video and/or audio encoding and/or compression algorithms, which may comprise, for example, MPEG-2, MPEG-4 AVC, MP3, AC-3, AAC, and/or HE-AAC.

Media streams are sometimes broadcast via the Internet. Internet head-ends are utilized, for example, to communicate multimedia streaming data, which may correspond to TV broadcasts, via the Internet based on one or more applicable networking standards, including TCP/IP.

Televisions (TVs) and/or other audiovisual playback devices are utilized to play received TV and/or media broadcasts. The received TV and/or media broadcasts are inputted directly into the playback devices, and the playback devices are enabled to perform, for example, necessary tuning and/or processing operations to extract the audio/video information. Alternately, specialized devices referred to as set-top boxes are utilized to provide necessary processing operations that convert TV and/or Internet based media broadcasts to signals suitable for play via the playback devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for PVR on Internet enabled TVs, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for personal video recording (PVR) on Internet enabled TVs. In various embodiments of the invention, a media playback device may be operable to determine whether replacement media content corresponding to at least a portion of a received broadcast media stream is available during reception of the broadcast media stream from one or more broadcast sources. The broadcast sources may comprise satellite head-ends, cable head-ends, and/or broadcast media head-ends, accessible, for example, via the Internet. At least some of the replacement media content may then be retrieved when personal video recording (PVR) operations are requested during play of the received broadcast media stream, to enable seamless performance of the requested PVR operations using at least a portion of the retrieved replacement media content. Exemplary PVR operations may comprise pausing, fast forwarding, and/or rewinding. Play of the received broadcast media stream may be delayed to accommodate for the determination of availability of the replacement media content and/or retrieval of at least some of the replacement media content. The delay may be effectuated by, for example, buffering the received broadcast media stream during reception. The playback of received broadcast media streams may also be delayed in instances where availability and/or location of sources of replacement media content may be determined prior to any request of PVR operations wherein such delay may be due to, for example, buffering requirements in the media playback device. The replacement media content may be retrieved from a plurality of local and/or remote replacement servers. Where multiple replacement media streams are available at varying transmission rates, the lower rate streams may first be utilized to start off or pre-buffer during playback of broadcast media stream, and then switch to higher rate streams when the PVR operations are actually initiated. Availability of replacement media content, from remote replacement servers, may be determined based on programming data in the broadcast media stream, routing information provided by a broadcast source, and/or by inquiry via one or more cataloguing servers. The programming data may comprise program-specific metadata and/or broadcast guide data included in the broadcast media stream, which may be used to generate broadcast program guide information. The media playback device may also be operable to communicate matching information to the cataloguing servers to enabling offload performance of the determination of availability of replacement media content to the cataloguing servers. The matching information may comprise location, time, program, and/or provider information, which may be utilized to match current broadcast media streams with replacement media content available via remote replacement servers.

Figure 1A:
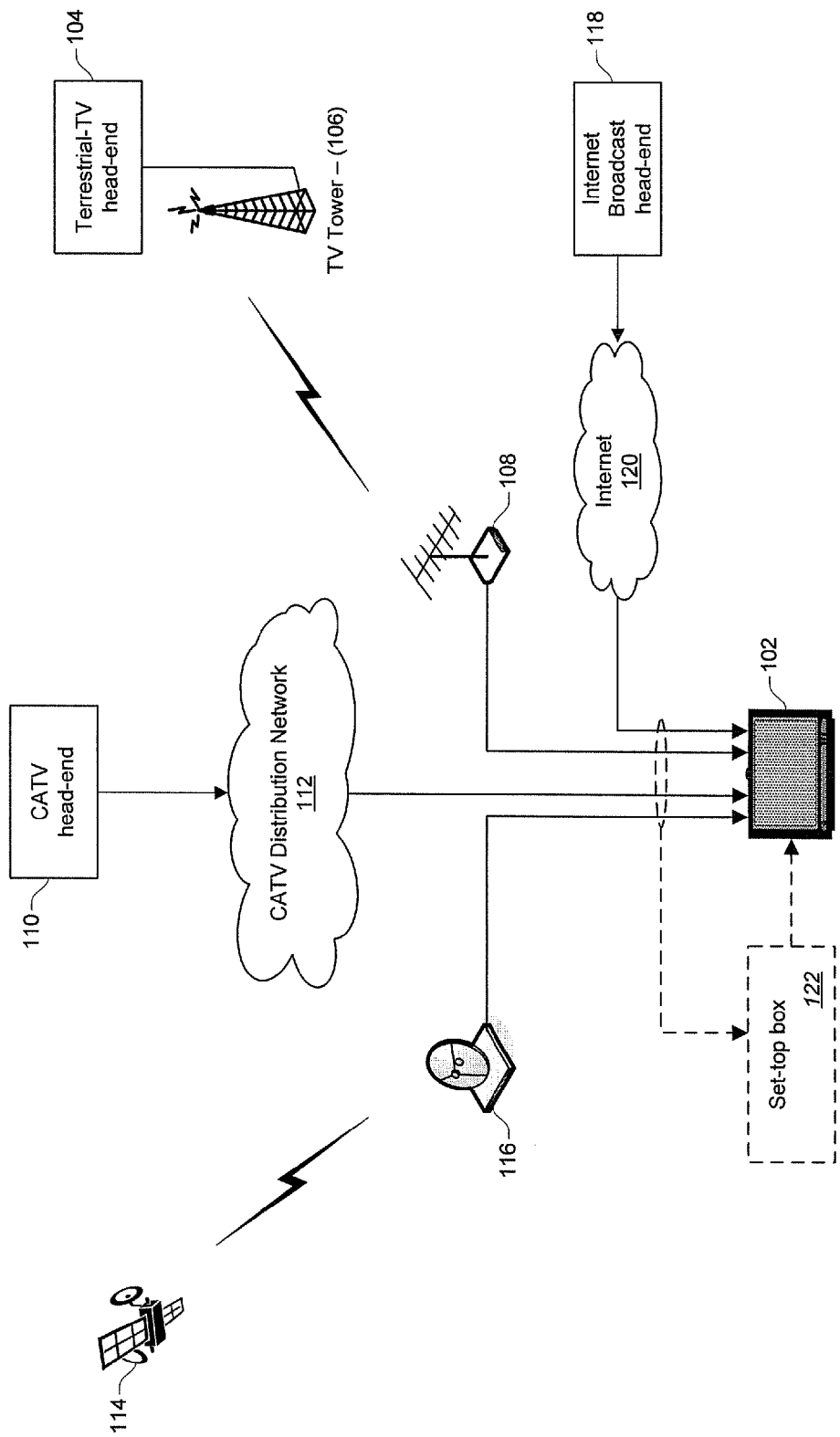
FIG. 1A is a block diagram illustrating a media playback device that is operable to utilize various types of media broadcasts and/or feeds, in accordance with an embodiment of the invention.

FIG. 1A is a block diagram illustrating a media playback device that is operable to utilize various types of media broadcasts and/or feeds, in accordance with an embodiment of the invention. Referring to FIG. 1A, there is shown a media playback device 102, a terrestrial-TV head-end 104, a TV tower 106, a TV antenna 108, a cable-TV (CATV) head-end 110, and a cable-TV (CATV) distribution network 112. FIG. 1A also comprises a satellite-TV head-end 114, a satellite-TV receiver 116, an Internet broadcast head-end 118, Internet 120, and a set-top box 122.

The media playback device 102 may comprise suitable logic, circuitry, interfaces, and/or code that enable playing of media streams, which may comprise audiovisual data. The media playback device 102 may comprise, for example, a television, a monitor, and/or other display and/or audio playback devices, and/or components that may be operable to playback video streams and/or accompanying audio data, which may be received, directly by the media playback device 102, via intermediate devices, for example the set-top box 122, and/or from local media recording/playback devices and/or storage resources. Exemplary local media recording/playback devices may comprise digital video disc (DVD) players, digital video recorders (DVRs), video game consoles, surveillance systems, personal computers (PCs) capture/playback cards, and/or stand-alone CH3/4 modulator boxes.

The terrestrial-TV head-end 104 may comprise suitable logic, circuitry, interfaces, and/or code that may enable over-the-air broadcast of TV signals, via one or more of the TV tower 106. The terrestrial-TV head-end 104 may be enabled to broadcast analog and/or digital encoded terrestrial TV signals. The TV antenna 108 may comprise suitable logic, circuitry, interfaces, and/or code that may enable reception of TV signals transmitted by the terrestrial-TV head-end 104, via the TV tower 106. The CATV head-end 110 may comprise suitable logic, circuitry, interfaces, and/or code that may enable communication of cable-TV signals. The CATV head-end 110 may be enabled to broadcast analog and/or digital formatted cable-TV signals. The CATV distribution network 112 may comprise suitable distribution systems that may enable forwarding of communication from the CATV head-end 110 to a plurality of cable-TV recipients, comprising, for example, the media playback device 102. For example, the CATV distribution network 112 may comprise a network of fiber optics and/or coaxial cables that enable connectivity between one or more instances of the CATV head-end 110 and the media playback device 102.

The satellite-TV head-end 114 may comprise suitable logic, circuitry, interfaces, and/or code that may enable down link communication of satellite-TV signals to terrestrial recipients, such as the media playback device 102. The satellite-TV head-end 114 may comprise, for example, one of a plurality of orbiting satellite nodes in a satellite-TV system. The satellite-TV receiver 116 may comprise suitable logic, circuitry, interfaces, and/or code that may enable reception of downlink satellite-TV signals transmitted by the satellite-TV head-end 114. For example, the satellite receiver 116 may comprise a dedicated parabolic antenna operable to receive satellite television signals communicated from satellite television head-ends, and to reflect and/or concentrate the received satellite signal into focal point wherein one or more low-noise-amplifiers (LNAs) may be utilized to down-convert the received signals to corresponding intermediate frequencies that may be further processed to enable extraction of audio/video data, via the set-top box 122 for example. Additionally, because most satellite-TV downlink feeds may be securely encoded and/or scrambled, the satellite-TV receiver 116 may also comprise suitable logic, circuitry, interfaces, and/or code that may enable decoding, descrambling, and/or deciphering of received satellite-TV feeds.

The Internet broadcast head-end 118 may comprise suitable logic, circuitry, interfaces, and/or code that may enable media/TV broadcasts via the Internet 120. The Internet 120 may comprise a system of interconnected networks, which enables exchange of information and/or data among a plurality of nodes, based on one or more networking standards, including, for example, TCP/IP. For example, the Internet 120 may enable connectivity among a plurality of private and public, academic, business, and/or government nodes and networks, wherein the physical connectivity may be provided via the Public Switched Telephone Network (PSTN), via copper wires, fiber-optic cables, wireless interfaces, and/or other standards-based interfaces.

The set-top box 122 may comprise suitable logic, circuitry, interfaces, and/or code that may enable processing of TV and/or media streams/signals transmitted by one or more head-ends, for example the terrestrial-TV head-end 104, the CATV head-end 110, the satellite-TV head-end 114, and/or the Internet broadcast head-end 118. In an exemplary aspect of the invention, the set-top box 122 may also comprise suitable logic, circuitry, interfaces, and/or code that may enable generating and/or inputting of media feeds into the media playback device 102. For example, the set-top box 120 may comprise a personal video recording (PVR) playback function that may enable inputting, into the media playback device 102, recorded audio/video feeds during PVR operations. Exemplary PVR operations may comprise pausing, fast-forwarding, rewinding, and/or reverse-playing. The set-top box 122 may be used and stand-alone device external to the media playback device 102. Alternatively, some or all of the functions of the set-top box 122 may be integrated directly into the media playback device 102.

In operation, the media playback device 102 may be utilized to playback media streams received from one of available head-ends, and/or from one or more local sources. The media playback device 102 may receive, via the TV antenna 108, over-the-air TV broadcasts from the terrestrial-TV head end 104 transmitted via the TV tower 106. The media playback device 102 may also receive cable-TV broadcasts, which may be communicated by the CATV head-end 110 via the CATV distribution network 112; satellite TV broadcasts, which may be communicated by the satellite head-end 114 and received via the satellite receiver 116; and/or Internet media broadcasts, which may be communicated by the Internet broadcast head-end 118 via the Internet 120.

TV head-ends may utilize various encoding schemes in TV broadcasts. Historically, TV broadcasts have utilized analog modulation format schemes, comprising, for example, NTSC, PAL, and/or SECAM. Audio encoding may comprise utilization of separate modulation scheme, comprising, for example, BTSC, NICAM, mono FM, and/or AM. More recently, however, there has been a steady move towards Digital TV (DTV) based broadcasting, where digital modulation format schemes, comprising, for example, QAM, VSB, or OFDM, may be utilized for TV broadcasts to enable transmission and/or reception of video and/or audio streams as discrete signals. For example, the terrestrial-TV head-end 104 may be enabled to utilize ATSC and/or DVB based standards to facilitate DTV terrestrial broadcasts. Similarly, the CATV head-end 110 and/or the satellite head-end 114 may also be enabled to utilize appropriate encoding standards to facilitate cable and/or satellite based broadcasts.

The media playback device 102 may be enabled to directly process media broadcasts to enable playing of corresponding video and/or audio data. Alternatively, an external device, for example the set-top box 122, may be utilized to perform processing operations and/or functions, which may be operable to extract video and/or audio data from received media streams, and the extracted audio/video data may then be played back via the media playback device 102.

In an exemplary aspect of the invention, the media playback device 102 may be operable, directly and/or via the set-top box 122 and/or additional local resources, to retrieve replacement media data that may be enable personal video recording (PVR) operations during live media broadcasts. Exemplary PVR operations may comprise pausing, fast-forwarding, rewinding, and/or reverse-playing. Accordingly, rather than using a dedicated PVR device, which may require dedicated processing and/or storage to facilitate PVR operations, data that may be necessary to perform PVR operations may be retrieved on per-need basis, to simplify processing and/or storage requirement for each individual user, and to offload at least some of the required storage and/or processing during PVR operations to dedicated and centralized entities.

Figure 1B:
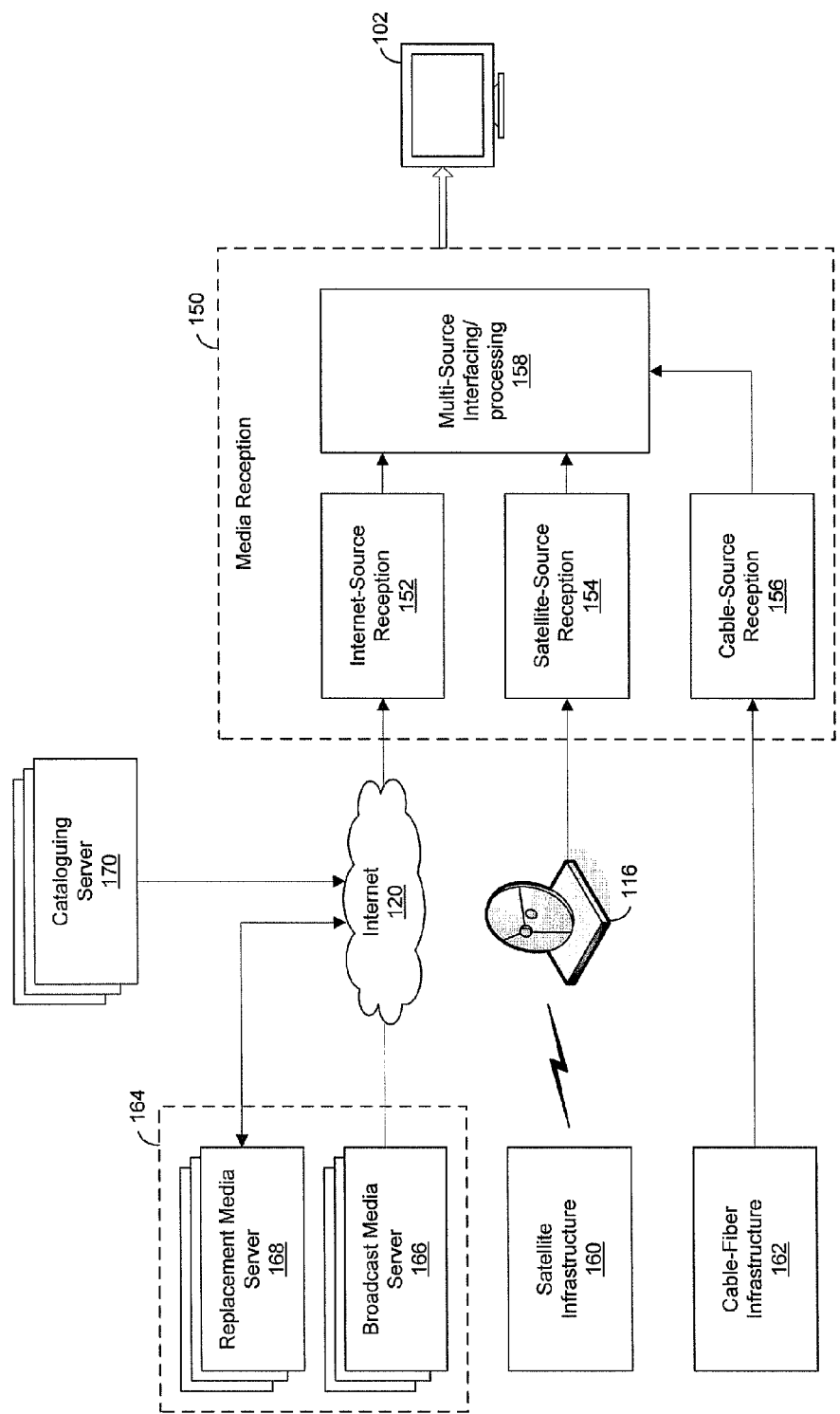
FIG. 1B is a block diagram that illustrates an exemplary media reception system that may communicate with replacement media servers which may provide replacement media data for personal video recording (PVR) operations during broadcast media reception, in accordance with an embodiment of the invention.

FIG. 1B is a block diagram that illustrates an exemplary media reception system that may communicate with replacement media servers which may provide replacement media data for personal video recording (PVR) operations during broadcast media reception, in accordance with an embodiment of the invention. Referring to FIG. 1B, there is shown the media playback device 102, the satellite receiver 116, the Internet 120, a media broadcast reception system 150, an Internet-source reception module 152, a satellite-source reception module 154, a cable-source reception module 156, and a multi-source reception and processing module 158. FIG. 5B also comprises a satellite infrastructure 160, a cable-fiber infrastructure 162, an Internet media infrastructure 164, a plurality of broadcast media server 166, a plurality of replacement media server 168, and a plurality of cataloguing server 170.

The media broadcast reception system 150 may comprise suitable logic, circuitry, interfaces, and/or code that enable reception of media streams and/or data, to facilitate playback operations via the media playback device 102 for example. The media broadcast reception system 150 may be integrated directly into the media playback device 102 to enable reception of media streams directly via the media playback device 102. Alternatively, at least some of the functions and/or sub-components of the media broadcast reception system 150 may be integrated into an external processing device, for example the set-top box 122. The media broadcast reception system 150 may comprise a plurality of modules, devices, components, and/or subsystems that may enable reception of media broadcasts from one or more different broadcast media head-ends. For example, the media broadcast reception system 150 may comprise, for example, the Internet-source reception module 152, the satellite-source reception module 154, the cable-source reception module 156, and/or the multi-source reception and processing module 158.

The Internet-source reception module 152 may comprise suitable logic, circuitry, interfaces, and/or code that may enable performing various processing operations to facilitate reception of broadcast media streams carried via Internet packets, which may be received from the broadcast media server 166 and/or one or more of the plurality of replacement media server 168, via the Internet 120 for example. The Internet-source reception module 152 may be operable to extract audio/video data that may then be made presentable and/or playable via audiovisual devices, for example the media playback device 102.

The satellite-source reception module 154 may comprise suitable logic, circuitry, interfaces, and/or code that may enable performing various processing operations to facilitate reception of satellite based media streams, which may be received in the form of satellite RF signals from the satellite infrastructure 160 via the satellite receiver 116. The satellite-source reception module 154 may be operable to extract audio/video data that may then be made playable via audiovisual devices, for example the media playback device 102. The cable-source reception module 156 may comprise suitable logic, circuitry, interfaces, and/or code that may enable performing various processing operations to facilitate reception of cable/fiber based media signals, which are received via the cable-fiber infrastructure 162. The cable-source reception module 156 may be operable to extract audio/video data that may then be made playable via audiovisual devices, for example the media playback device 102.

The multi-source reception and processing module 158 may comprise suitable logic, circuitry, interfaces, and/or code that may enable performing various processing operations to support reception of media broadcast from a plurality of supported interfaces, which may comprise satellite, cable-fiber, and/or Internet based interfaces. The multi-source reception and processing module 158 may be operable to further processing and/or extraction of audio/video data received via any supported interfaces, wherein the extracted audio/video data may then be made playable via audiovisual devices, for example the media playback device 102. The multi-source reception and processing module 158 may also enable combining audio/video data received concurrently via two or more interfaces.

The satellite infrastructure 160 may comprise suitable logic, circuitry, interfaces, and/or code that may enable communication of media broadcasts via, for example, one or more satellite networks. For example, the satellite infrastructure 160 may comprise a plurality of the satellite TV head-end 114. The satellite infrastructure 160 may also comprise necessary terrestrial support, control, and/or relay systems and devices that may be operable to enable communication of satellite TV broadcasts via the satellite infrastructure 160. The cable-fiber infrastructure 162 may comprise suitable logic, circuitry, interfaces, and/or code that may enable media broadcasts via one or more cable-fiber based networks. For example, the cable-fiber infrastructure 162 may comprise a plurality of the CATV head-end 110, which may be utilized to enable communication of cable-television (CATV) broadcasts, and may also comprise a plurality of distribution systems, for example the CATV distribution network 112, which enable forwarding of CATV broadcasts to a plurality of CATV subscribers.

The Internet media infrastructure 164 may comprise suitable logic, circuitry, interfaces, and/or code that may enable media broadcasts via the Internet 120. For example, the Internet media infrastructure 164 may comprise a plurality of the Internet broadcast head-end 118. To facilitate Internet based media broadcasts and/or replacement data retrieval, the Internet media infrastructure 164 may comprise the plurality of the broadcast media server 166 and/or the plurality of replacement media server 168. The Internet 120 may provide, for example, connectivity between the media broadcast reception system 150, and the broadcast media server 166 and/or the replacement media server 168, to facilitate communication of broadcast media and/or retrieval of replacement media data, for example.

The broadcast media server 166 may comprise suitable logic, circuitry, interfaces, and/or code that are operable to broadcast media streams via the Internet 120. In an exemplary aspect of the invention, the replacement media server 168 may be utilized to support personal video recording (PVR) operations during live media broadcasts. The replacement media server 168 may comprise suitable logic, circuitry, interfaces, and/or code that may enable storage and/or retrieval of replacement media data. For example, the replacement media server 168 may enable and/or support replacement data retrieval, via the Internet 120, to facilitate PVR operations via the media broadcast reception system 150. The cataloguing server 170 may comprise suitable logic, circuitry, interfaces, and/or code that may enable locating presence of the plurality of replacement media server 168, and/or presence of replacement data therefrom. For example, the cataloguing server 170 may be operable to receive a replacement data search request, which may comprise matching data that enable matching broadcast streams with stored replacement data. The matching data may comprise, for example, time stamp, location data, program and/or provider identification data, and/or channel information.

In operation, the media broadcast reception system 150 may be operable to receive a plurality of media broadcasts from one or more available media broadcast sources, and the received media streams may be played via the media playback device 102 for example. For example, the satellite-source reception module 154 may be operable to receive satellite TV signals via the satellite receiver 116. The satellite TV signals may comprise satellite media broadcasts, which may be communicated via the satellite infrastructure 160. Satellite TV broadcasts may comprise a plurality of satellite TV channels, wherein signals carrying audio/video data corresponding to the various satellite TV channels are, for example, digitally modulated onto RF carriers. The satellite receiver 116 may be operable to enable receiving and down-converting, via low-noise-amplifiers (LNAs), downlink satellite RF signals. The resulting signals may then be communicated to the satellite-source reception module 154.

The cable-source reception module 156 may be operable to receive cable-fiber based signals, corresponding to CATV media broadcasts for example, which may be communicated via the cable-fiber infrastructure 162. CATV broadcasts may comprise a plurality of CATV channels, wherein signals carrying audio/video data corresponding to the various CATV channels are, for example, digitally modulated onto RF carriers. Accordingly, the cable-source reception module 156 may be operable to enable reception of CATV RF signals via available CATV distribution systems.

The satellite-source reception module 154 and/or cable-source reception module 156 may be utilized to, perform necessary processing operations, which may comprise, for example, RF tuning and/or other reception related processing operations, include demodulation, filtering, and/or conversion of the received RF signals to enable extracting communicated data. The processing operations may also comprise, for example, operations to enable decryption and/or decoding of transport packets, including video and/or audio decoding and processing.

The Internet-source reception module 152 may be operable to receive media broadcast communicated by Internet-based head-ends. For example, the Internet-source reception module 152 may be operable to receive media broadcast communicated by one or more of the plurality of broadcast media server 166 via the Internet 120. Internet-based media broadcasts may be communicated via a plurality of Ethernet packets which may be utilized to carry audio/video data, based on one or more applicable networking standards, comprising, TCP/IP and/or UDP connections, for example. Accordingly, the Internet-source reception module 152 may be operable to establish connectivity to the broadcast media server 166 through the Internet 120, for example, to facilitate the reception of Internet-based media broadcasts.

The Internet-source reception module 152, the satellite-source reception module 154, and/or the cable-source reception module 156 may be operable to processes the extracted audio/video data to enable playing or presentation of corresponding media streams via the media playback device 102. Alternatively, at least some of the additional audio/video processing may be performed in separate components, via the multi-source reception and processing module 158 for example. The multi-source reception and processing module 158 may also be operable to combine audio/video data received concurrently from a plurality of sources.

In an exemplary aspect of the invention, the media broadcast reception system 150 may be operable to support personal video recording (PVR) operations using replacement media data during reception of media broadcasts. Exemplary PVR operations may comprise pausing, fast-forwarding, rewinding, and/or reverse-playing. The PVR operations may be performed, for example, during reception of ongoing and/or live media broadcasts by the media broadcast reception system 150, via the Internet-source reception module 152, the satellite-source reception module 154, and/or the cable-source reception module 156. For example, the Internet-source reception module 152 may be operable to retrieve, via the Internet 120, for example, replacement media data corresponding to ongoing media broadcasts from one or more of the plurality of the replacement media server 168 in the Internet infrastructure 164.

The media broadcast reception system 150 may also be operable to locate and/or determine availability of replacement data via one or more of the replacement media server 168. Determining the availability of replacement data may be performed based on, for example, content of received broadcast streams. For example, the media broadcast reception system 150 may be operable to extract and/or analyze program-specific metadata and/or guide data integrated into the received data. The program-specific metadata may typically be utilized to provide information about programs during live broadcast playback, and the guide data may be utilized to provide TV guide interfacing function during live broadcast.

In another embodiment of the invention, the matching and/or location operation may be offloaded to one or more of the cataloguing server 170, which may be utilized to enable the media broadcast reception system 150 to determine a location of the replacement media servers 168, and/or to determine availability of replacement data therefrom. For example, the media broadcast reception system 150 may communicate a replacement media request message to the cataloguing server 170, which comprise matching information. The matching information may comprise, for example, time stamp, location information, program and/or provider identification information, and/or channel information. The cataloguing server 170 may utilize the matching information to ascertain whether and/or where replacement content may be found from any of the one or more replacement media server 168.

Replacement media routing information may also be integrated into broadcast streams. For example, the cable-source media streams communicated via the cable-fiber infrastructure 162 may comprise routing information that may enable the media broadcast reception system 150 to locate one or more of the replacement media server 168. The routing information may comprise, for example, IP addressing information that enable locating, and connecting to the replacement media server 168 via the Internet 120. Once availability and/or location of replacement data is determine, replacement data that may be retrieved from the replacement media server 168 may be specified. Since live broadcast may comprise advertising content that may not be included in replacement data stored via the replacement media server 168, a determination of the elapsed time in the live broadcast must account for advertising time. Various methods may be utilized to determine the current elapsed time in live broadcasts during playback operations. For example, program-specific metadata may be utilized to determine start time and current time, and a statistical method, based on predetermined criteria and/or prior tracking information, may be utilized to estimate advertising time within the elapsed time between start time and the current time. Advertisements may also be detected and tracked dynamically during live broadcast playback to calculate, dynamically, the duration of such advertisements. The cataloguing server 170 may be utilized to locate replacement content, and determined elapsed time in the broadcast stream, to determine start of required data, and/or to account on advertisements during live broadcasts, which may not be included in any such replacement content.

Figure 2:
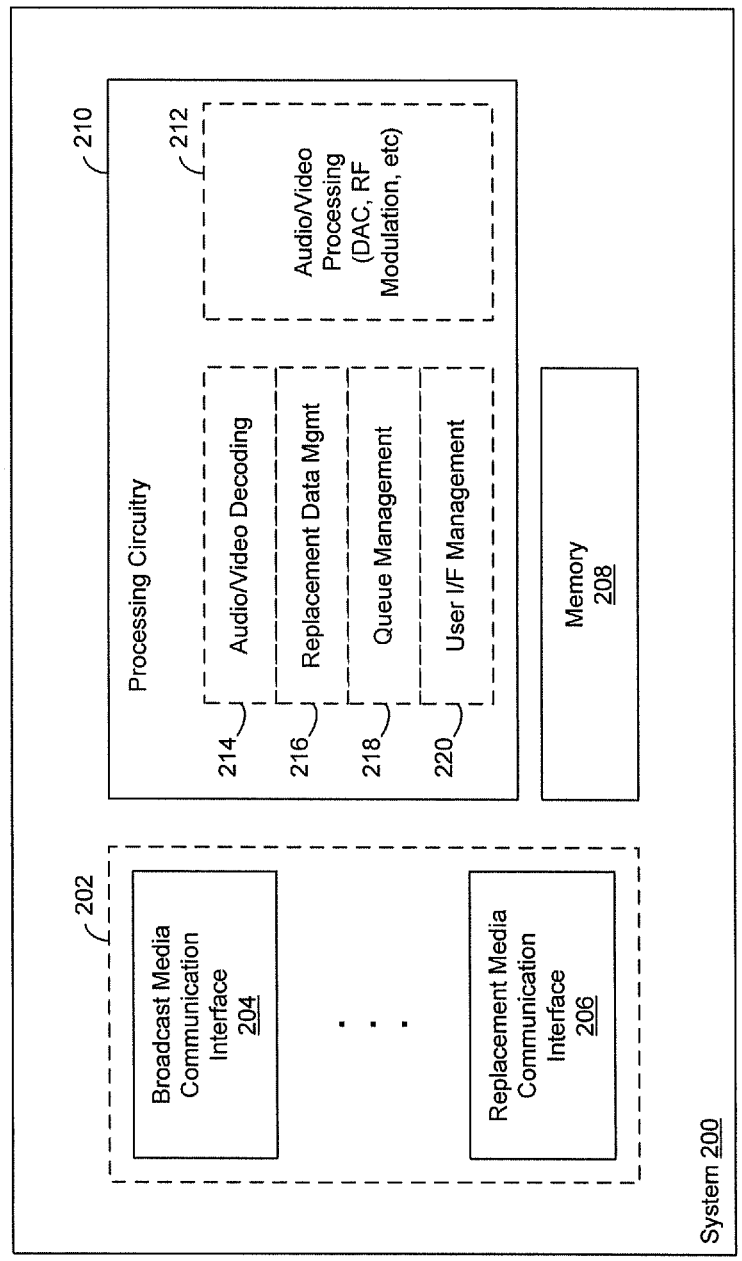
FIG. 2 is a block diagram that illustrates an exemplary processing system that enables retrieving replacement media data from replacement media servers for personal video recording (PVR) operations during broadcast media reception, in accordance with an embodiment of the invention.

FIG. 2 is a block diagram that illustrates an exemplary processing system that enables retrieving replacement media data from replacement media servers for personal video recording (PVR) operations during broadcast media reception, in accordance with an embodiment of the invention. Referring to FIG. 2, there is shown, a media processing system 200, a media communication interface subsystem 202, a memory 208, a processing circuitry 210, an audio/video processing module 212, an audio/video decoding module 214, a replacement data management module 216, a queue management module 218, and a user interface (I/F) management module 220.

The media processing system 200 may comprise suitable logic, interfaces, circuitry, and/or code that may be operable to receive broadcast media and/or retrieval of replacement data during PVR operations. The media processing system 200 may comprise, for example, the media communication interface subsystem 202, the memory 208, and the processing circuitry 210. The media processing system 200 may be operable to receive broadcast media streams, via the media communication interface subsystem 202, from broadcast media head-ends. The media processing system 200 may also be operable to perform PVR operations by enabling retrieval of replacement data that may be used during such PVR operations.

The media communication interface subsystem 202 may comprise suitable logic, interfaces, circuitry, and/or code that may be operable to receive media content from one or more sources. The media communication interface subsystem 202 may comprise, for example, the broadcast media communication interface 204, which is operable to receive broadcast media content from one or more broadcast head-ends. The media communication interface subsystem 202 may also comprise the replacement media communication interface 206, which is operable to enable reception of replacement data from one or more instances of the replacement media server 168.

The memory 208, for example, may be utilized to enable temporary storage and/or buffering during operations by other subsystems and/or entities in the media processing system 200. In this regard, the memory 208 may comprise different memory technologies, including, for example, read-only memory (ROM), random access memory (RAM), and/or Flash memory.

The processing circuitry 210 may comprise suitable logic, interfaces, circuitry, and/or code that may be operable to perform various processing operations in the media processing system 200, to facilitate reception of broadcast media and/or retrieval of replacement data. The processing circuitry 210 may comprise, for example, the audio/video processing module 212, the audio/video decoding module 214, the replacement data management module 216, the queue management module 218, and the user I/F management module 220. The audio/video processing module 212 may comprise suitable logic, interfaces, circuitry, and/or code that enable generation of output audio and/or video streams for local playback operations. The audio/video decoding module 214 may be operable, for example, to generate audio and/or video streams from the received broadcast and/or the replacement media data. The resulting audio/video information may be playable and/or displayable via suitable audiovisual devices, for example the media playback device 102. In this regard, the audio/video processing module 212 may perform necessary audio/video encoding and/or modulation operations on audio/video data received via, and/or extract from broadcast media streams and/or retrieved replacement data, to generate playback data that is formatted in accordance with standards supported via the media playback device 102 for example. The audio/video decoding module 214 may be operable to process received broadcast content and/or replacement media data to extract audio/video information contained therein. The audio/video decoding module 214 may comprise, for example, suitable logic, interfaces, circuitry, and/or code that enable performing of audio and/or video processing operations, including, for example, necessary decompression and/or decoding operations, pertaining to one or more audio/video encoding schemes, which may comprise, for example, MPEG-2, MPEG-4 AVC, MP3, AC-3, AAC, and/or HE-AAC.

The replacement data management module 216 may comprise suitable logic, interfaces, circuitry, and/or code that are operable to locate and/or retrieve replacement data to facilitate PVR operations during reception of broadcast media streams via the media processing system 200. The replacement data management module 216 may track, for example, PVR commands (e.g. fast-forwarding, pausing, rewinding) that may be issued by a viewer. The replacement data management module 216 may then search, directly and/or via the cataloguing server 170, for replacement data that may be available via the replacement media server 168. The replacement data management module 216 may also be utilized to manage use of retrieved replacement data during PVR operation via the media processing system 200. The queue management module 218 may comprise suitable logic, interfaces, circuitry, and/or code that enable managing data queuing during playback and/or PVR operations, to enable, for example, seamless use of retrieved replacement data during PVR operations. The queue management module 218 may manage, for example, buffering of data used during playback operations, wherein such data buffering enable performing retrieval of replacement data and/or combining replacement data onto playback streams. The queued data may be buffered, for example, in the memory 208.

The user I/F management module 220 may be operable to communicate with the replacement media server 168 and/or the cataloguing server 170 via the media processing system 200, utilizing, for example, one or more physical interfaces, logical interfaces, and/or application programming interfaces (API). The user I/F management module 220 may be operable to facilitate, for example, HTTP based client functions that enables establishing peer-to-peer connections, via the Internet 120, with HTTP based server functions running on the replacement media server 168 and/or cataloguing server 170 during replacement data retrieval operations.

In operation, the media processing system 200 may be integrated into, for example, the media playback device 102 and/or the set-top box 122, to enable reception and playback of media streams from one or more broadcast head-ends. For example, the broadcast media communication interface 204, the memory 208, and/or the processing circuitry 210 may be operable to enable receiving and processing of media streams carried, for example, via RF signals and/or Internet-based packets from the satellite infrastructure 160, the cable-fiber infrastructure 162, and/or the broadcast media server 166. The audio/video processing module 212 may then be operable to generate suitable playback streams for playback operations via the media playback device 102.

In an exemplary embodiment of the invention, the media processing system 200 may be operable to perform PVR operations based on the availability of replacement data. Available replacement date may be retrieved from offloaded storage entities. The replacement data management module 216 may be utilized to determine when PVR commands are requested. The replacement data management module 216 may then determine availability of replacement data. For example, the replacement data management module 216 may utilize the replacement media communication interface 206 to search for available replacement media servers 168 via the Internet 120. The user I/F management module 220 may be operable to facilitate peer-to-peer connectivity between the media processing system 200 and the replacement media server 168 and/or the cataloguing server 170 during replacement data search and/or retrieval operations. The user I/F management module 220 may also be utilized, for example, to enable performing access security operations where the replacement media server 168 may require authentication operations that may require user verification information.

The availability of replacement data may be determined directly via the replacement data management module 216, based on, for example, program-specific metadata and/or guide data included the received broadcast streams. Alternatively, the replacement data management module 216 may communicate with, via the replacement media communication interface 206 and the Internet 120, the cataloging server 170 to locate one or more instances of the replacement media server 168 that may contained suitable replacement data. During retrieval of replacement data, the replacement data management module 216 may be operable to determine current elapsed time in received broadcast media streams, accounting for advertising time for example, to ensure that retrieved replacement media matches current position in playback operations, to facilitate seamless PVR operations. The determination may alternatively be offloaded to the cataloguing server 170. The replacement media server 168 may communicate the replacement data, if available, via the Internet 120, for example.

Figure 3:
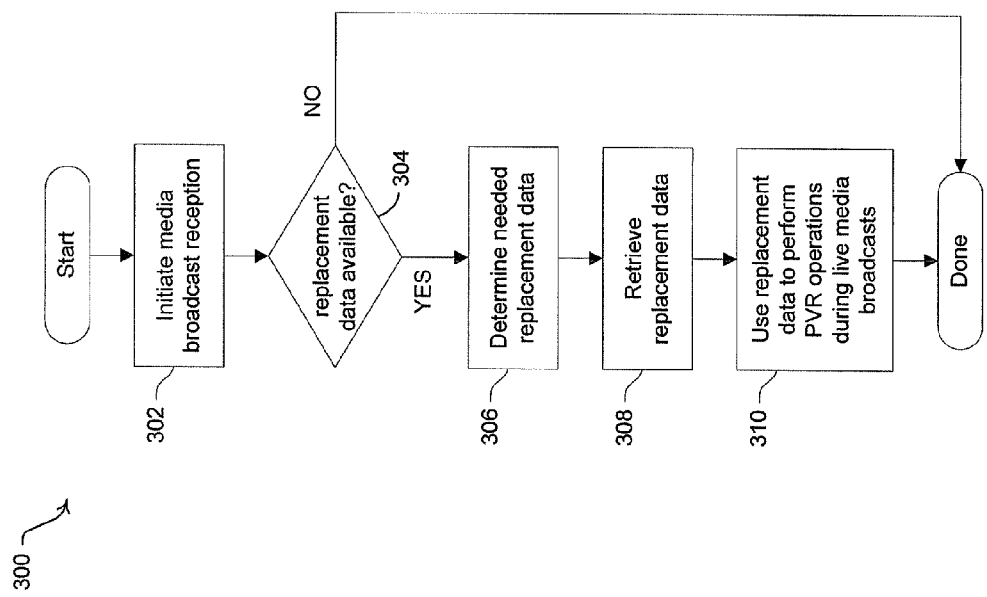
FIG. 3 is a flow chart that illustrates exemplary retrieval of replacement data to enable personal video recording (PVR) operations during broadcast media reception in set-top boxes, in accordance with an embodiment of the invention.

FIG. 3 is a flow chart that illustrates exemplary retrieval of replacement data to enable personal video recording (PVR) operations during broadcast media reception in set-top boxes, in accordance with an embodiment of the invention. Referring to FIG. 3, there is shown a flow chart 300 comprising a plurality of exemplary steps, which may executable via the media processing system 200, for example, to enable retrieving replacement data to facilitate PVR operations.

In step 302, broadcast data reception is initiated. For example, the media processing system 200 initiates reception of media broadcast via the broadcast media communication interface 204. In step 304, availability of replacement data for PVR operations may be determined. For example, during media broadcast reception via the media processing system 200, PVR operations, which may comprise fast-forward, rewind, and/or pause, may be requested via the media playback device 102. Accordingly, and to facilitate performing such PVR operations, the media processing system 200 may be operable to search for one or more instances of the replacement media server 168, which may comprise replacement data. The replacement data management module 216 may be operable to determine, via the replacement media communication interface 206, whether the replacement media server 168 is accessible, via the Internet 120 for example. The determination may be performed directly via the media processing system 200, and/or via the cataloguing server 170. In instances where it is determined that the replacement media server 168 is inaccessible, the exemplary steps may terminate.

Returning to step 304, in instances where it is determined that the replacement media server 168 is accessible; the exemplary steps may proceed to step 306. In step 306, a determination of needed replacement data may be performed. For example, the current elapsed time may be determined, accounting for advertising time for example, via the media processing system 200 and/or via the cataloguing server 170, and a request for replacement data may then be communicated to the replacement media server 168. In step 308, the replacement data may be retrieved from the replacement media server 168. For example, the media processing system 200 may be operable to receive, via the replacement media communication interface 206, replacement data communicated by the replacement media server 168 via the Internet 120. In step 310, the replacement data may be utilized to perform requested PVR operations seamlessly via the media playback device 101. In other words, the media playback device 101 may utilize the received replacement data such that it may appear to the user/viewer that the PVR operations are performed directly on broadcast streams. The replacement data may be processed via the processing circuitry 210, wherein the replacement data management module 216 may be operable to manage extraction of audio/video information of the retrieved data, which may be decoded via the audio/video decoding module 214, and queued and/or buffered utilizing the queue management module 218 and the memory 209. The extracted data which need be used during PVR operations may then be processed via the audio/video processing module 212 to enable generation of corresponding streams for playback via the media playback device 102.

Various embodiments of the invention may comprise a method and system for PVR on Internet enabled TVs. The media processing system 200 may be operable to determine availability of replacement media content corresponding to at least a portion of broadcast media streams received, via the broadcast media communication interface 204, from the satellite infrastructure 160, the cable-fiber infrastructure 162, and/or the Internet media infrastructure 164. The replacement media content may be retrieved from, for example, one or more of the remote replacement media server 168. At least some of the replacement media content may be retrieved, via the replacement media communication interface 206, when personal video recording (PVR) operations are requested during play of received broadcast media streams, to enable seamless performance of the requested PVR operations using at least a portion of the retrieved replacement media content. Exemplary PVR operations may comprise pausing, fast forwarding, and/or rewinding. The replacement data management module 216 may be operable to manage performing PVR operations using replacement data content, including controlling, locating and/or retrieving replacement data to facilitate PVR operations during reception of broadcast media streams via the media processing system 200. Play of the received broadcast media stream may be delayed, during processing of the processing circuitry 210, to accommodate for the determination of availability of the replacement media content, via the remote replacement media server 168, and/or retrieval of at least some of the replacement media content, for example. The delay may be effectuated by, for exampling, buffering the received broadcast media stream, via the memory 208, during reception. The delay may also be introduced during processing via the audio/video processing module 212. The playback of received broadcast media streams may also be delayed even where availability and/or location of sources of replacement media content may be determined prior to any request of PVR operations wherein such delay may be due to, for example, buffering requirements in the media processing system 200. In addition, where multiple replacement media streams are available at varying transmission rates, the lower rate streams may first be utilized to start off or pre-buffer during playback of broadcast media stream, and then switch to higher rate streams when the PVR operations are actually initiated. Also, where replacement media content may be available from a plurality of sources, the media processing system 200 may be operable to transition between sources during PVR operations. For example, the media processing system 200 may initially use a first source that may provide necessary replacement content at desirable transmission rate and/or delay, and may then switch to another source if the first source used initially comprises only part of the required content and/or becomes unavailable. Availability of replacement media content, from remote replacement media server 168, may be determined, via the replacement data management module 216, based on programming data in the broadcast media stream, routing information provided by a broadcast source, and/or by inquiry via one or more cataloguing servers 170. The programming data may comprise program-specific metadata and/or broadcast guide data included in the broadcast media stream, which may be used to generate broadcast program guide information. The media processing system 200 may also be operable to communicate matching information to the cataloguing server 170 to enabling offload performance of the determination of availability of replacement media content to the cataloguing server 170. The matching information comprise location, time, program, and/or provider information, which may be utilized to match current broadcast media streams with replacement media content available via remote replacement servers. The media processing system 200 may return to playing the broadcast media stream based on, for example, user input, completion of PVR operations, and/or after all available replacement media content is used. The media processing system 200 may be operable to perform the return to playback of broadcast media stream seamlessly.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for PVR on Internet enabled TVs.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video processing, the method comprising:
   during reception of a broadcast media stream from one or more broadcast sources, determining whether replacement media content corresponding to at least a portion of the broadcast media stream is available from a replacement media server;
   retrieving at least some of the replacement media content from the replacement media server when a personal video recording (PVR) operation is requested during play of the broadcast media stream; and
   performing the PVR operation directly on at least a portion of the replacement media content retrieved from the replacement media server in place of a corresponding portion of the broadcast media stream,
   wherein the at least portion of the retrieved replacement media content and the corresponding portion of the broadcast media stream being replaced with during the PVR operation are directed to same video content such that the PVR operation that is performed on the at least portion of the retrieved replacement media content appears to be performed directly on the corresponding portion of the broadcast media stream.

2. The method according to claim 1, wherein the one or more broadcast sources comprise satellite head-ends, cable head-ends, and/or broadcast media head-ends.

3. The method according to claim 1, wherein the at least some of the replacement media content are retrieved from the replacement media server by way of the Internet.

4. The method according to claim 1, comprising delaying playback of the broadcast media stream to account for buffering requirements, and/or to accommodate for the determination of availability of the replacement media content and/or the retrieval of the at least some of the replacement media content.

5. The method according to claim 4, comprising buffering the broadcast media stream to enable generating the delay.

6. The method according to claim 1, wherein the PVR operation comprises at least one of pausing, fast forwarding, or rewinding.

7. The method according to claim 1, comprising determining availability of the replacement media content, via a plurality of remote replacement servers, based on programming data in the broadcast media stream, routing information provided via at least some of the broadcast sources, and/or via one or more cataloguing servers.

8. The method according to claim 7, wherein the programming data comprise program-specific metadata and/or broadcast guide data included in the broadcast media stream.

9. The method according to claim 7, comprising communicating matching information to the one or more cataloguing servers to perform the determination of availability of the replacement media content via the one or more cataloguing servers,
   wherein the matching information comprise location, time, program, and/or provider information.

10. The method according to claim 1,
    wherein the portion of the retrieved replacement media content and the corresponding portion of the broadcast media stream being replaced with during the PVR operation have a same duration.

11. The method according to claim 1, wherein the retrieving further comprises:
    determining current elapsed time in the broadcast media stream to ensure that the retrieved replacement media content matches current playback position in the broadcast media stream to facilitate the PVR operation.

12. A system for video processing, the system comprising:
    one or more processors, one or more circuits, or any combination thereof configured to:
    determine whether replacement media content corresponding to at least a portion of a broadcast media stream is available from a replacement media server during reception of the broadcast media stream from one or more broadcast sources;
    retrieve at least some of the replacement media content from the replacement media server when a personal video recording (PVR) operation is requested during play of the broadcast media stream; and
    perform the PVR operation directly on at least a portion of the replacement media content retrieved from the replacement media server in place of a corresponding portion of the broadcast media stream,
    wherein the at least portion of the retrieved replacement media content and the corresponding portion of the broadcast media stream are directed to same video content such that the PVR operation that is performed on the at least portion of the retrieved replacement media content appears to be performed directly on the corresponding portion of the broadcast media stream.

13. The system according to claim 12, wherein the one or more broadcast sources comprise satellite head-ends, cable head-ends, and/or broadcast media head-ends.

14. The system according to claim 12, wherein the one or more processors, the one or more circuits, or any combination thereof are configured to retrieve at least some of the replacement media content from the replacement media server by way of the Internet.

15. The system according to claim 12, wherein the one or more processors, the one or more circuits, or any combination thereof are configured to delay playback of the broadcast media stream to account for buffering requirements in the system, and/or to accommodate for the determination of availability of the replacement media content and/or the retrieval of the at least some of the replacement media content from the replacement media server.

16. The system according to claim 15, wherein the one or more processors, the one or more circuits, or any combination thereof are configured to buffer the broadcast media stream to enable generating the delay.

17. The system according to claim 12, wherein the PVR operation comprises at least one of pausing, fast forwarding, or rewinding.

18. The system according to claim 12, wherein the one or more processors, the one or more circuits, or any combination thereof are configured to determine availability of the replacement media content, via a plurality of remote replacement servers, based on programming data in the broadcast media stream, routing information provided via at least some of the broadcast sources, and/or via one or more cataloguing servers.

19. The system according to claim 18, wherein the programming data comprise program-specific metadata and/or broadcast guide data included in the broadcast media stream.

20. The system according to claim 18, wherein the one or more processors, the one or more circuits, or any combination thereof are configured to communicate matching information to the one or more cataloguing servers to perform the determination of availability of the replacement media content via the one or more cataloguing servers, the matching information comprising location, time, program, and/or provider information.

21. A system for video processing, the system comprising:
means for determining whether replacement media content corresponding to at least a portion of a broadcast media stream is available from a replacement media server during reception of the broadcast media stream from one or more broadcast sources;
means for retrieving at least some of the replacement media content from the replacement media server when a personal video recording (PVR) operation is requested during play of the broadcast media stream; and
means for performing the PVR operation directly on at least a portion of the replacement media content retrieved from the replacement media server in place of a corresponding portion of the broadcast media stream, wherein the at least portion of the retrieved replacement media content and the corresponding portion of the broadcast media stream are directed to same video content such that the PVR operation that is performed on the at least portion of the retrieved replacement media content appears to be performed directly on the corresponding portion of the broadcast media stream.

* * * * *